United States Patent
Toms et al.

(10) Patent No.: US 11,984,709 B2
(45) Date of Patent: May 14, 2024

(54) ACTUATOR FOR A SWITCH GEAR OF AN ELECTRIC PANEL

(71) Applicant: Appleton Grp LLC, Rosemont, IL (US)

(72) Inventors: Rinu Toms, Pune (IN); Shriram Divekar, Pune (IN); Amit Kulkarni, Pune (IN); Mukunda Rao, Pune (IN)

(73) Assignee: APPLETON GRP LLC, Rosemont, IL (US)

( * ) Notice: Subject to any disclaimer, the term of this patent is extended or adjusted under 35 U.S.C. 154(b) by 163 days.

(21) Appl. No.: 17/845,269

(22) Filed: Jun. 21, 2022

(65) Prior Publication Data
US 2023/0170674 A1    Jun. 1, 2023

(30) Foreign Application Priority Data

Dec. 1, 2021  (IN) .............................. 202121055761

(51) Int. Cl.
*H02B 11/04*  (2006.01)
*H02B 1/26*   (2006.01)

(52) U.S. Cl.
CPC .............. *H02B 11/04* (2013.01); *H02B 1/26* (2013.01)

(58) Field of Classification Search
CPC .. H01H 2003/105; H01H 71/00; H01H 71/08; H01H 71/0207; H01H 71/1018; H01H 3/02; H01H 3/54; H01H 3/46; H01H 69/00; H01H 77/10; H01H 3/10; H01H 9/042; H01H 9/22; H01H 9/002;
(Continued)

(56) References Cited

U.S. PATENT DOCUMENTS 3,980,845 A   9/1976  Gryctko et al.
5,577,603 A   11/1996 Bogdanovs et al.
(Continued)

FOREIGN PATENT DOCUMENTS

CN    111517247 A    8/2020
DE    10127552 A1    12/2002
IN    201621010920 A  3/2016

OTHER PUBLICATIONS

Prior Art, "Protection to help optimize machine performance—Discover the complete TeSys GV Range", Schneider Electric, Brochure, 2019, 24 pages.
(Continued)

*Primary Examiner* — Anthony R Jimenez
(74) *Attorney, Agent, or Firm* — MCDONNELL BOEHNEN HULBERT & BERGHOFF LLP

(57) ABSTRACT

The present disclosure relates to the field of switch gears, and envisages an actuator for a switch gear of an electric panel having a door. The actuator comprises an aligner assembly and an actuator plate assembly. The aligner assembly comprises an aligner pivotably mounted on the switch gear housing, and engaging with a toggle of a circuit breaker, of the switch gear, to angularly displace the toggle. The aligner has a pair of slanting flanges configured to define a valley separated by a gap. The actuator plate assembly comprises a mounting plate mounted on the enclosure door. A shaft element, having a handle element and an engaging element, passes through the mounting plate. The engaging element is configured to nest in the gap of the aligner to angularly displace the aligner.

10 Claims, 13 Drawing Sheets

(58) Field of Classification Search
CPC .... H01R 13/113; H01R 13/18; H01R 25/162; H02B 11/04; H02B 11/127; H02B 1/26; H02B 1/00; H02B 1/04; H02B 1/044; H02B 1/056; H02B 1/28; H02B 1/30; H02B 1/301; H02B 1/32; H02B 13/00; H02B 13/02
USPC ........................................................ 200/465
See application file for complete search history.

(56) References Cited

U.S. PATENT DOCUMENTS

| | | | |
|---|---|---|---|
| 7,417,849 B2 | | 8/2008 | Dixon et al. |
| 8,497,439 B2 | | 7/2013 | Pai et al. |
| 9,117,597 B2 | | 8/2015 | McClung et al. |
| 9,413,144 B1 | * | 8/2016 | Ledbetter ................. H02B 3/00 |
| 2014/0209443 A1 | | 7/2014 | McClung et al. |
| 2016/0020052 A1 | | 1/2016 | Kaufman |
| 2021/0313126 A1 | * | 10/2021 | Lopez Menendez .. H02B 13/00 |

OTHER PUBLICATIONS

Prior Art, "PowerPlus EPL and D2L panelboards—Lighting and heat tracing", Eaton, Crouse-Hinds Series, Brochure, 2022, 10 pages.

Prior Art, "The Smarter Chocie for Explosion Protected Circuit Breaker Panels", EPiK Breaker Panels, Stahl, Brochure, 2019, 8 pages.

* cited by examiner

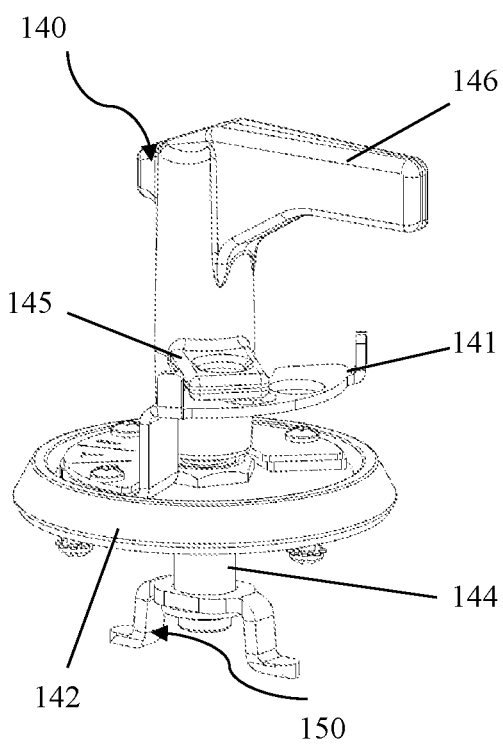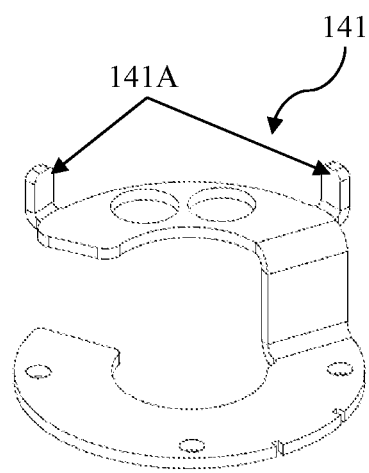
Figure 8
Figure 9

ACTUATOR FOR A SWITCH GEAR OF AN ELECTRIC PANEL

RELATED APPLICATIONS

This application claims priority to Indian Patent Application No. 202121055761 filed Dec. 1, 2021, entitled "An Actuator For a Switch Gear of an Electrical Panel", the entire contents of which are incorporated by reference herein in their entirety.

FIELD

The present disclosure relates to the field of switch gears, particularly switch gears that are located in IP66 conditions.

BACKGROUND

The background information herein below relates to the present disclosure but is not necessarily prior art.

Electrical panels housing switch gears for devices such as electric motors, thermostats, valves, regulators, and gearboxes amongst others located in IP66 conditions often do not provide an operator with visual access to ensure that the breaker knob or the toggle of the circuit breaker of the switch gear is switched ON or OFF. To push the toggle in the required position, an actuator is provided on the panel door wherein the actuator is configured to abut the toggle at all times. However, due to the uncertainty of the position of the toggle, the operator tends to push the actuator with a relatively large amount of force to make sure that it engages with the toggle.

As a result of the force applied, the actuator disc can interfere with the toggle, thereby damaging the sheet metal door of the electrical panel, and preventing the actuator from engaging with the toggle.

There is therefore felt a need for an actuator for a switch gear of the electric panel, which alleviates the aforementioned drawbacks.

OBJECTS

Some of the objects of the present disclosure, which at least one embodiment herein satisfies, are as follows:

An object of the present disclosure is to provide an actuator for a switch gear of an electric panel.

Another object of the present disclosure is to provide an actuator for a switch gear of an electric panel which cannot be visually accessed in IP66 conditions.

Yet another object of the present disclosure is to provide an actuator for a switch gear of an electric panel, which engages with a toggle of the circuit breaker of the switch gear without exerting a relatively large amount of force.

Still another object of the present disclosure is to provide an actuator for a switch gear of an electric panel, which does not damage the door of the electrical panel when engaging with the toggle of the circuit breaker of the switch gear.

Other objects and advantages of the present disclosure will be more apparent from the following description, which is not intended to limit the scope of the present disclosure.

SUMMARY

The present disclosure envisages an actuator for a switch gear of an electric panel. The electric panel is configured to be located in an IP66 environment. The panel is provided with a door. The switch gear has a housing and a circuit breaker provided on the housing displaceable relative thereto. The circuit breaker has a toggle protruding therefrom.

The actuator comprises an aligner assembly and an actuator plate assembly. The aligner assembly comprises an aligner pivotably mounted on the switch gear housing. The aligner is configured to be engaged with a toggle of the circuit breaker to define a plurality of angular positions of the aligner corresponding to a plurality of toggle positions. The aligner has at least one pair of slanting flanges configured at a first operative end thereof at a spaced apart distance to define a valley separated by a gap therebetween. The actuator plate assembly comprises a mounting plate mounted on the enclosure door. The shaft element passes through the mounting plate and the door. A handle element is provided on a first operative half of the shaft element which remains outside the panel. The handle element is configured to be angularly displaced to facilitate rotation of the shaft element. The engaging element is attached to a second operative half of the shaft element which is inside the panel. The engaging element has at least one leg extending therefrom. The leg is configured to be nested in the gap of the aligner to angularly displace the aligner after being guided along the valley.

BRIEF DESCRIPTION OF THE ACCOMPANYING DRAWING

An actuator, of the present disclosure, for a switch gear of an electric panel will now be described with the help of the accompanying drawing, in which:

FIG. 8 illustrates an isometric view of an actuator plate assembly of the actuator of FIG. 5;

FIG. 9 illustrates an isometric view of a stopper plate of the actuator of FIG. 8;

Figure 1:
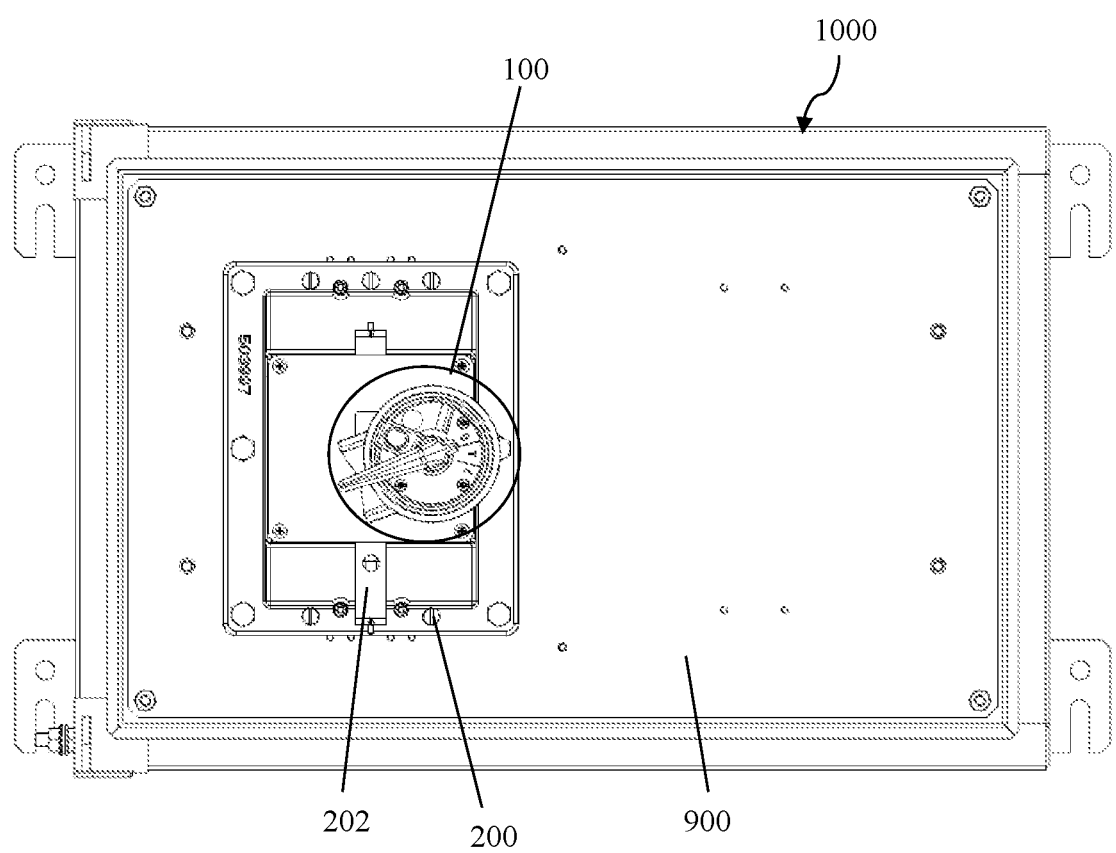
FIG. 1 illustrates a front view of the electric panel with the actuator.
Figure 2:
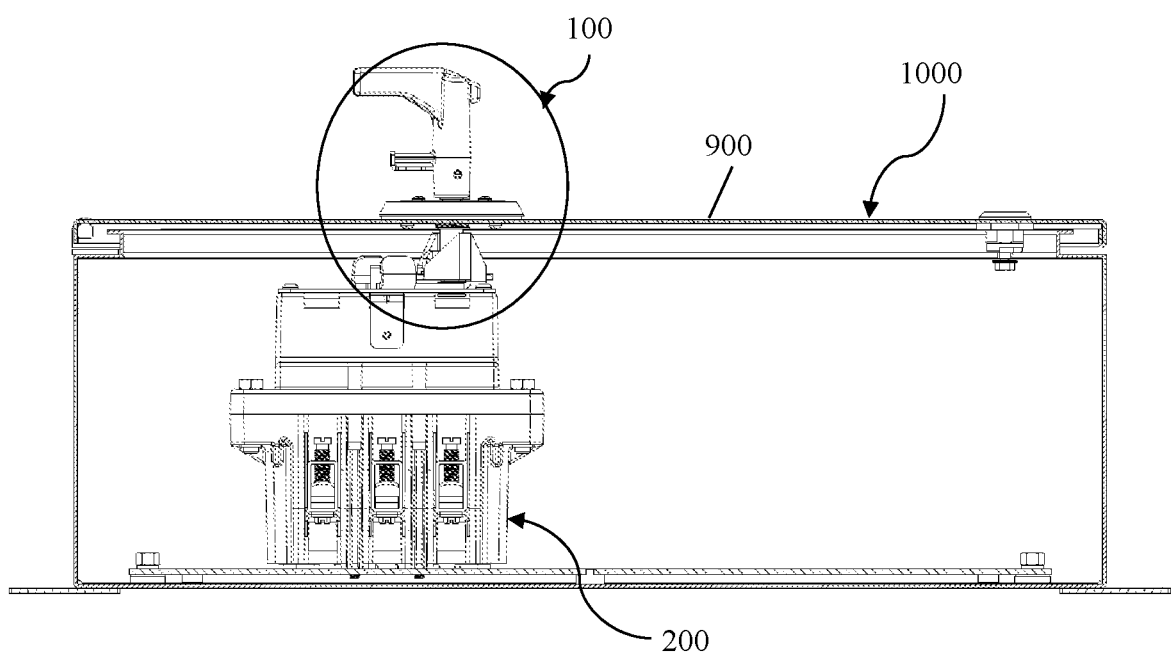
FIG. 2 illustrates a side view of the electric panel of FIG. 1.
Figure 3A:
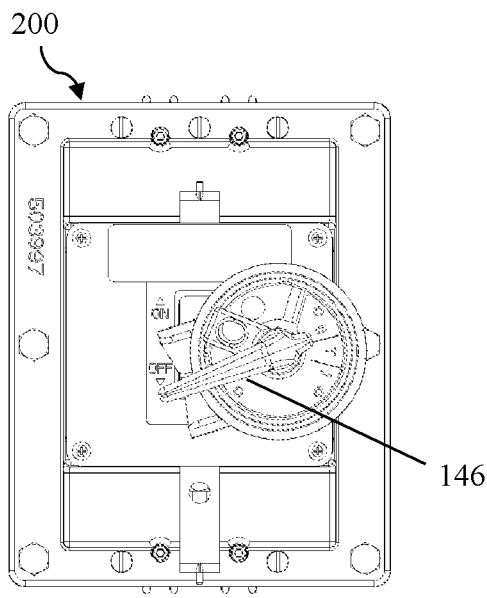
FIG. 3A illustrates a front view of the switch gear with the handle of the actuator in OFF position.
Figure 3B:
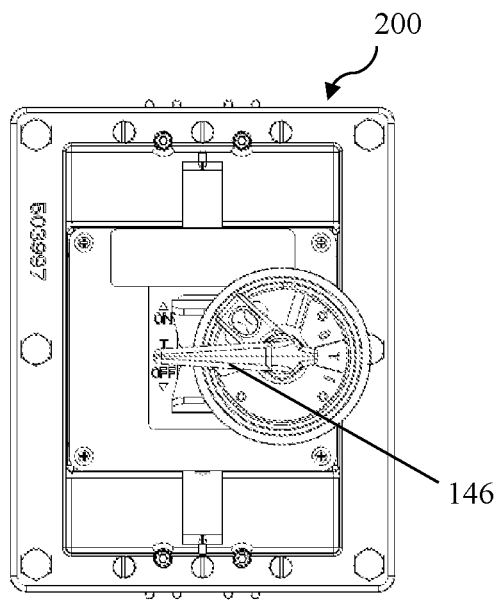
FIG. 3B illustrates a front view of the switch gear with the handle of the actuator in TRIP position.
Figure 3C:
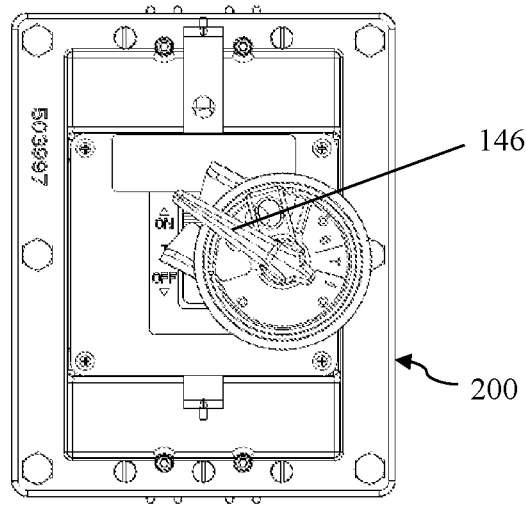
FIG. 3c illustrates a front view of the switch gear with the handle of the actuator in ON position.
Figure 4:
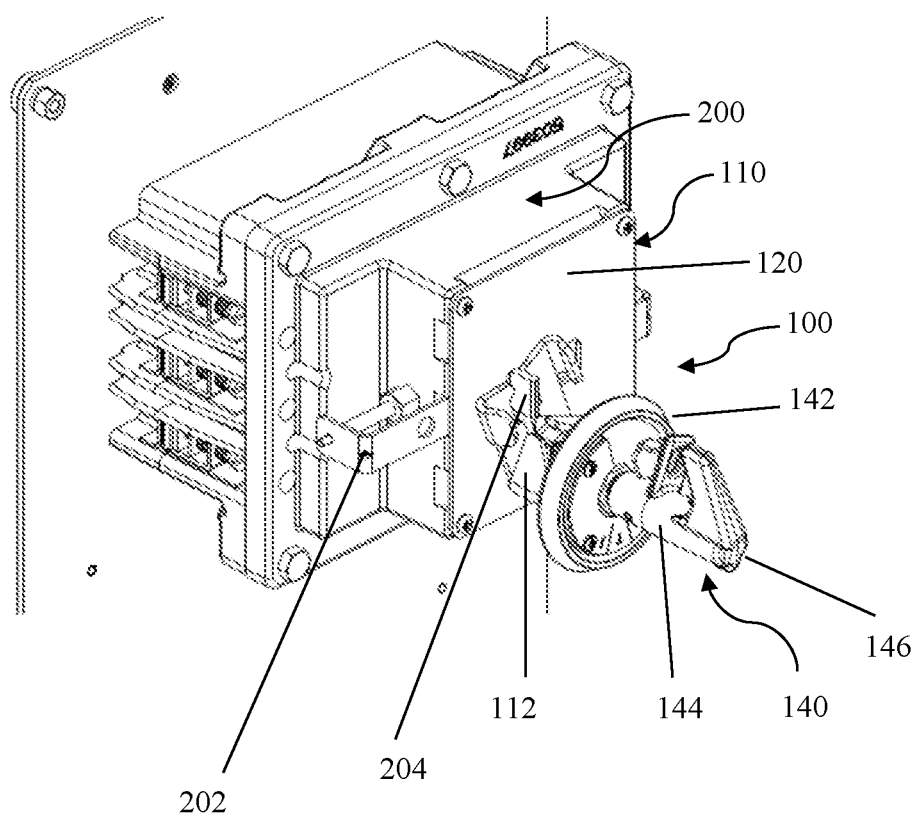
FIG. 4 illustrates an isometric side view of the switch gear with the actuator of FIG. 1.
Figure 5:
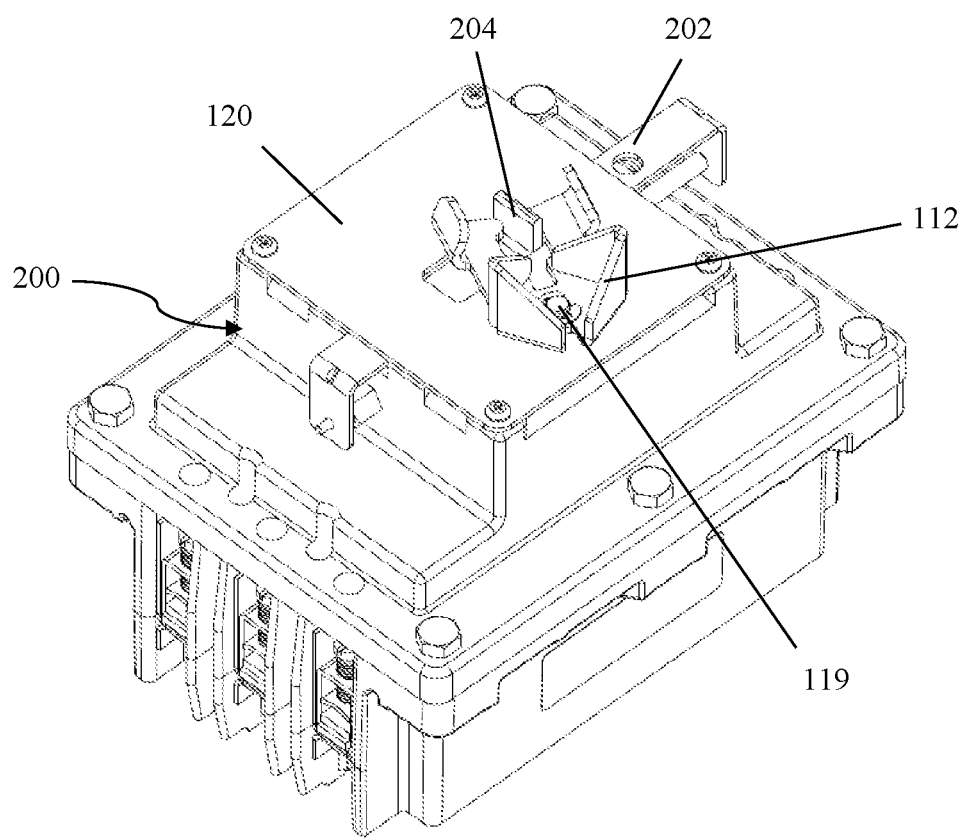
FIG. 5 illustrates an isometric top view of the switch gear with the actuator of FIG. 1.
Figure 6:
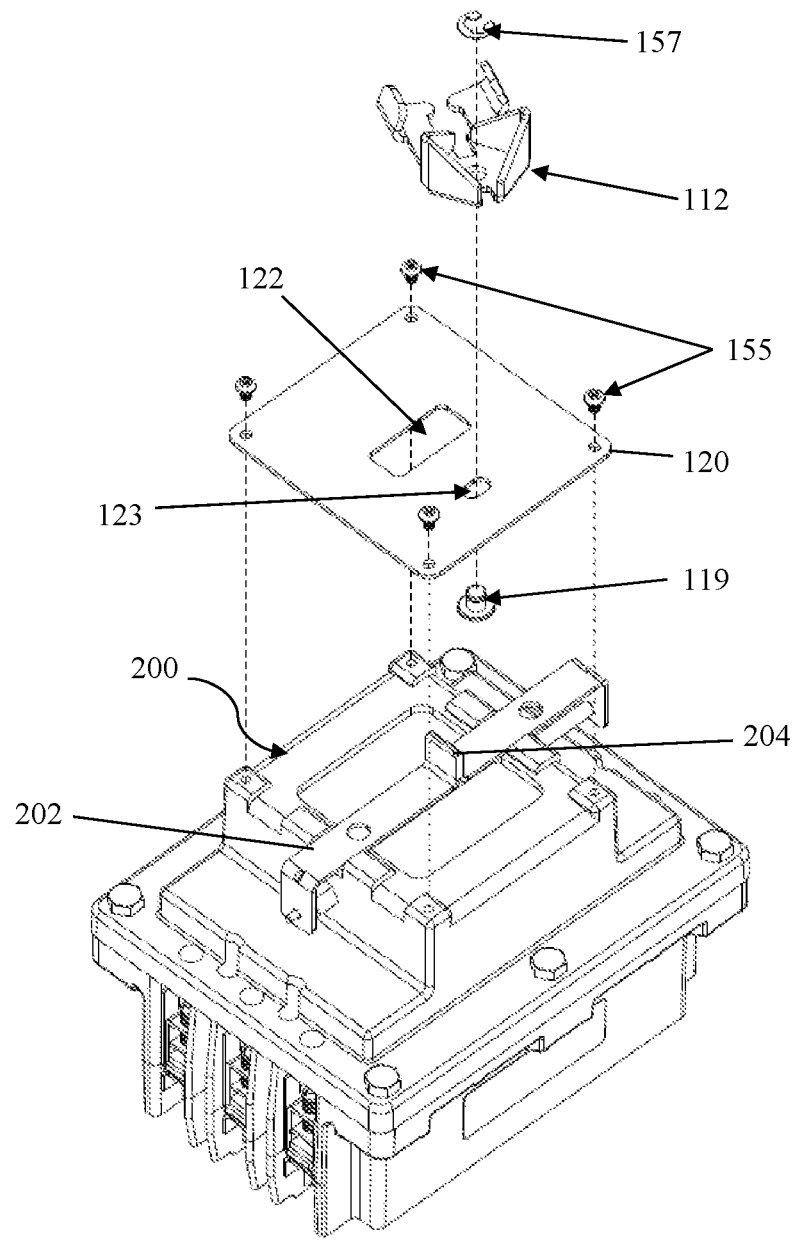
FIG. 6 illustrates an exploded isometric top view of the aligner assembly of the actuator, of FIG. 5, mounted on the switch gear.

LIST OF REFERENCE NUMERALS 100 actuator
110 aligner assembly
111 ear 112 aligner
113 aperture
114 slanting flange
115 slot
116 valley
117 gap
119 pivoting pin
120 cover plate
122 first aperture
123 second aperture
140 actuator plate assembly
141 stopper plate
142 mounting plate
144 shaft element
145 arm
146 handle element
150 engaging element
151 slot
152 leg
155 fasteners
157 circlip
200 housing
202 circuit breaker
204 toggle
900 door
1000 electric panel
141A stopping elements

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a", "an" and "the" may be intended to include the plural forms as well, unless the context clearly suggests otherwise. The terms "comprises", "comprising", "including", "includes" and "having" are open-ended transitional phrases and therefore specify the presence of stated features, elements, modules, units and/or components, but do not forbid the presence or addition of one or more other features, elements, components, and/or groups thereof.

An actuator 100, of the present disclosure, for a switch gear of an electric panel 1000 will now be disclosed with reference to FIG. 1 through FIG. 12E. The electric panel 1000 is configured to be located in an IP66 environment which makes it difficult for an operator to manually actuate the switch gear. The panel 1000 is provided with a door 900. The switch gear has a housing 200, and a circuit breaker 202 provided on the housing 200. The circuit breaker 202 has a toggle 204 provided thereon which facilitates linear displacement of the circuit breaker 202 relative to the housing 200.

The actuator 100 comprises an aligner assembly 110 and an actuator plate assembly 140. The aligner assembly 110 comprises an aligner 112 pivotably mounted on the switch gear housing 200. The aligner 112 is configured to be engaged with a toggle 204 of the circuit breaker 202, to define a plurality of angular positions of the aligner 112 corresponding to a plurality of toggle 204 positions. The aligner 112 has at least one pair of slanting flanges 114 configured at a first operative end thereof at a spaced apart distance from each other to define a valley 116 separated by a gap 117 therebetween.

The actuator plate assembly 140 comprises a mounting plate 142 mounted on the enclosure door 900. A shaft element 144 is configured to pass through the mounting plate 142 and the door 900 such that a second half of the shaft element 144 extends through the door 900 inside the panel 1000, while the first half remains outside the panel 1000. A handle element 146 is provided on the first half of the shaft element 144. The handle element 146 is configured to be angularly displaced to facilitate rotation of the shaft element 144. An engaging element 150 is attached to an operative internal end of the shaft element 144. The engaging element 150 has at least one leg 152 extending therefrom. The leg 152 is configured to be nested in the gap 117 of the aligner 112 to angularly displace the aligner 112 after being guided along the valley 116.

In a working embodiment, pushing the toggle 204 of the circuit breaker 202 up switches ON the switch gear, whereas pushing down the toggle 204 switches OFF the switch gear. When the toggle 204 has to be switched ON, the handle element 146 is angularly displaced upwards which results in the engaging element 150 moving down the valley 116 along the contours defined by one of the legs 152 of the aligner. When the engaging element 150 reaches the gap 117 between the legs 152 of the aligner, the movement of the engaging element 150 is locked thereby causing the aligner 112 to be angularly displaced upwards. Since the toggle 204 is engaged with the aligner, the displacement of the aligner 112 results in pushing the toggle 204 in the upward direction, thus switching ON the switch gear. Similarly, the toggle 204 can be pushed downwards by angularly displacing the handle element 146 downward to switch off the switch gear.

In an embodiment, an aperture 113 is configured on the aligner 112 to receive the toggle 204 therein to enable engagement of the toggle 204 with the aligner. The aperture 113 is configured to be wide enough to allow the angular displacement of toggle 204 in the required direction. In another embodiment, a slot 115 is configured on the aligner 112 to receive a pivoting pin 119 therein. The slot 115 is configured offset from the aperture 113. The pivoting pin 119 is configured to enable pivoting of the aligner 112 about its axis so that pivoting movement of the aligner 112 causes angular displacement of the toggle 204.

In an embodiment, the aligner assembly 110 includes a cover plate 120 mounted on the housing 200 of the switch gear. The cover plate 120 is configured to facilitate mounting of the aligner 112 thereon. The cover plate 120 prevents direct contact of the aligner 112 with the switch gear housing 200. Further, the cover plate 120 has a first aperture 122 and a second aperture 123 configured thereon. The first aperture 122 configured on the cover plate enables the cover plate 120 to receive the toggle 204 therein. The second aperture 123 is configured on the cover plate 120 to receive the pivoting pin 119 therein.

In one embodiment, the handle element 146 is configured to be angularly displaced between an angular range varying from 0° to 24° in both upward and downward directions to switch ON and switch OFF the gear, respectively.

In an embodiment, when the handle element 146 is turned at 0°, the switch gear trips.

In an embodiment, the aligner 112 includes at least one ear 111 configured on an operative free end of the aligner. The ear 111 is configured to enable manual angular displacement of the aligner 112 to actuate or deactivate the circuit breaker 202 during maintenance of the switch gear which allows the door 900 to be opened.

Figure 10:
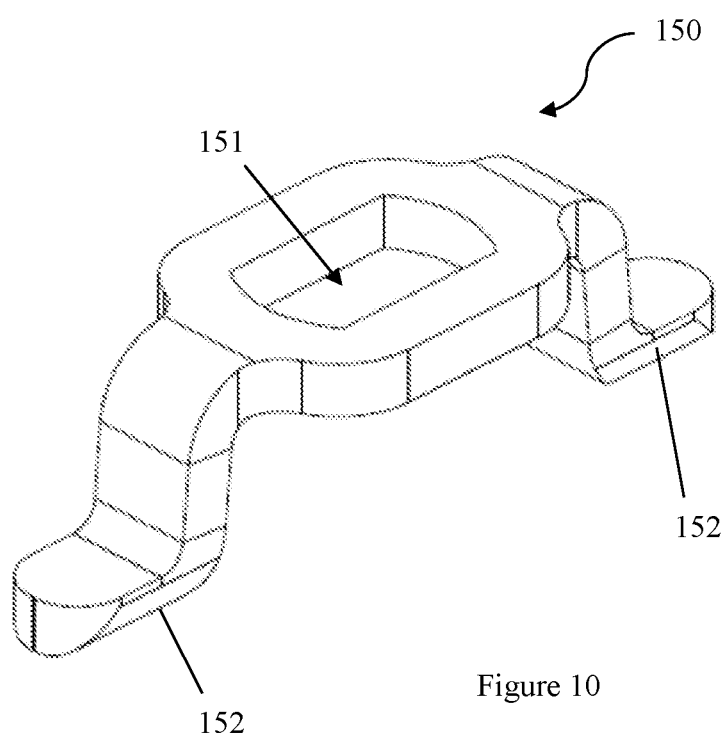
FIG. 10 illustrates an isometric view of an engaging element of the actuator of FIG. 8.
Figure 11:
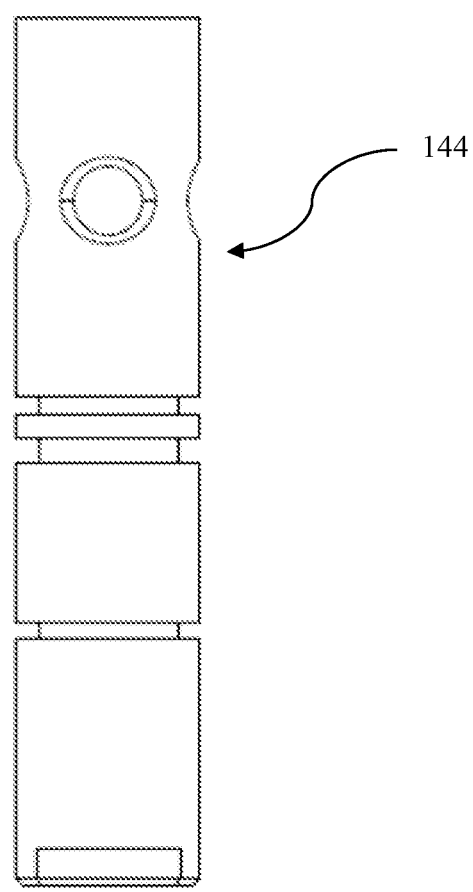
FIG. 11 illustrates a side view of a shaft element of the actuator of FIG. 8.

In one embodiment, as shown in FIG. 10, the engaging element 150 is defined by an arcuate body having a slot 151 configured thereon. The slot 151 is configured to facilitate engagement of the engaging element 150 with the shaft element 144. The engaging element 150 includes at least one leg 152 configured to extend from the arcuate body.

Figure 7A:
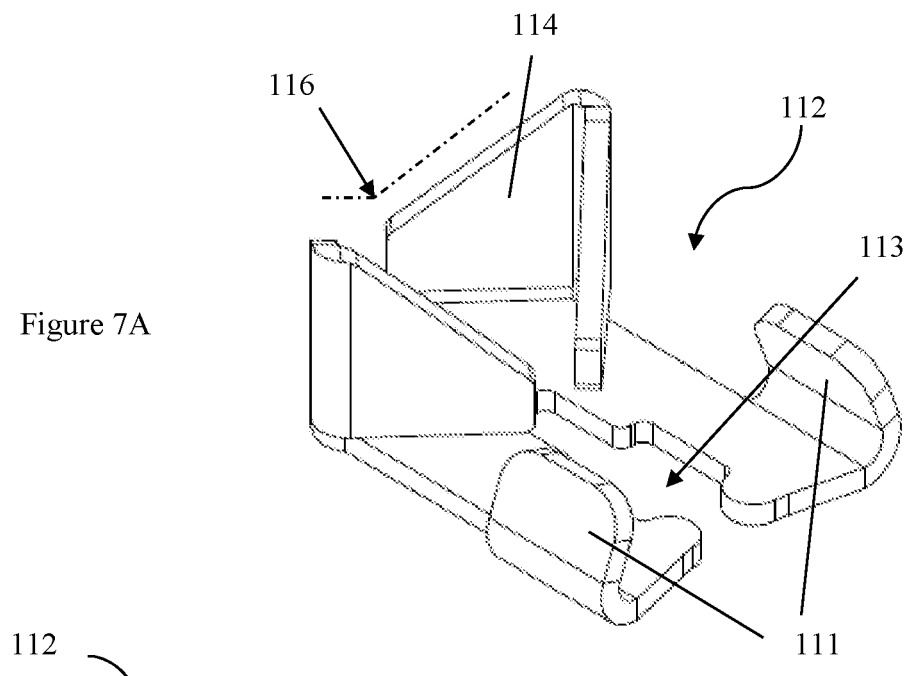
FIG. 7A and FIG. 7B illustrate isometric views of the aligner of the aligner assembly of FIG. 6.
Figure 7B:
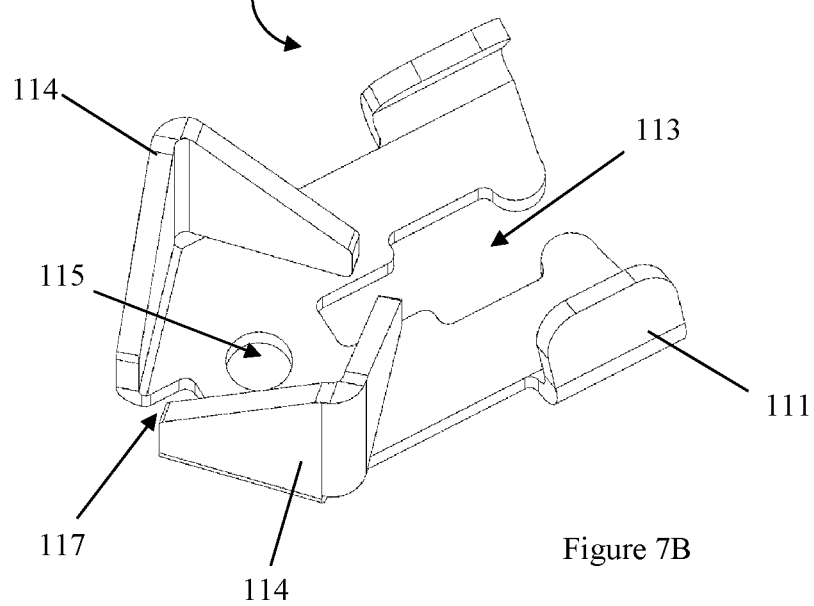
Figure 12A:
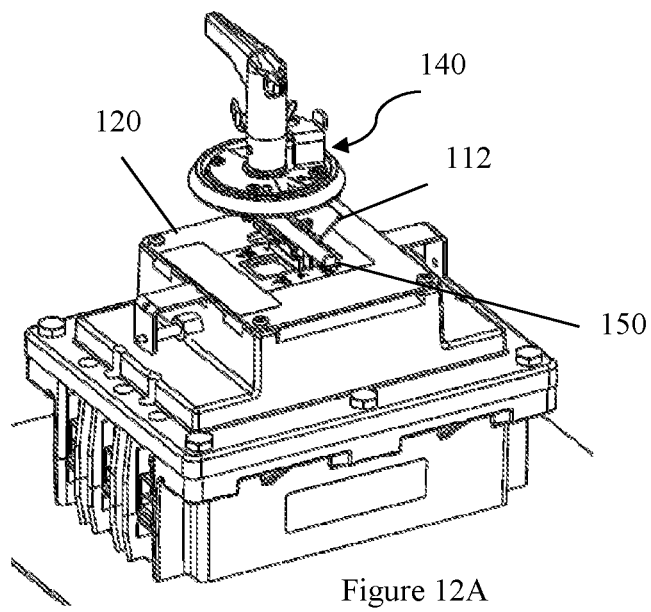
FIG. 12A to FIG. 12E illustrate different configurations of the aligner engaged with different configurations of the engaging plate.
Figure 12B:
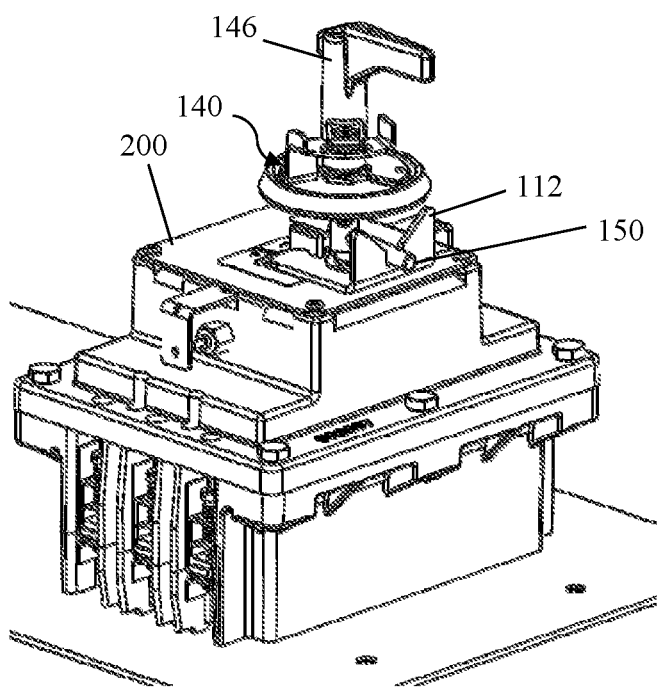
Figures 12C, 12D:
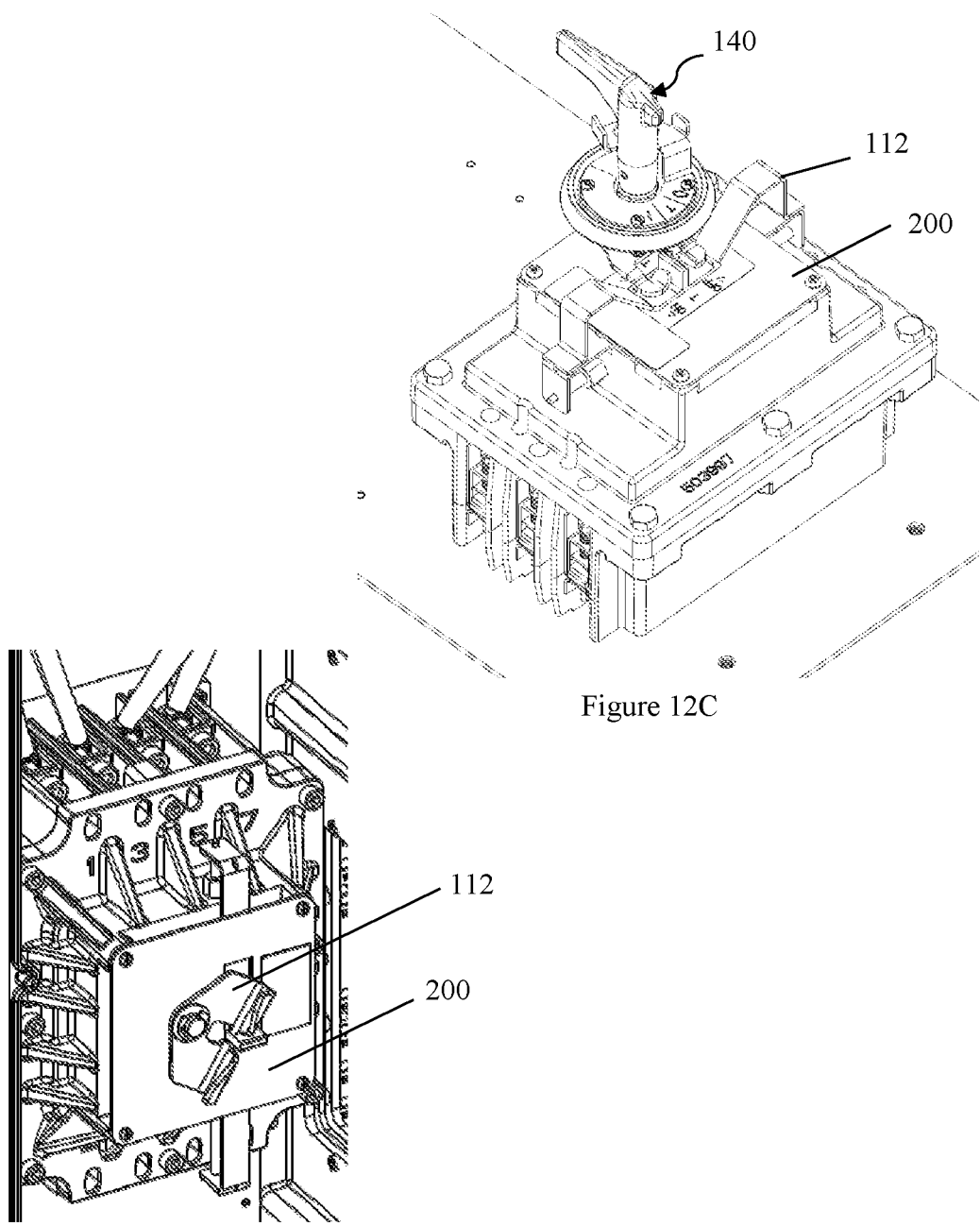
Figure 12E:
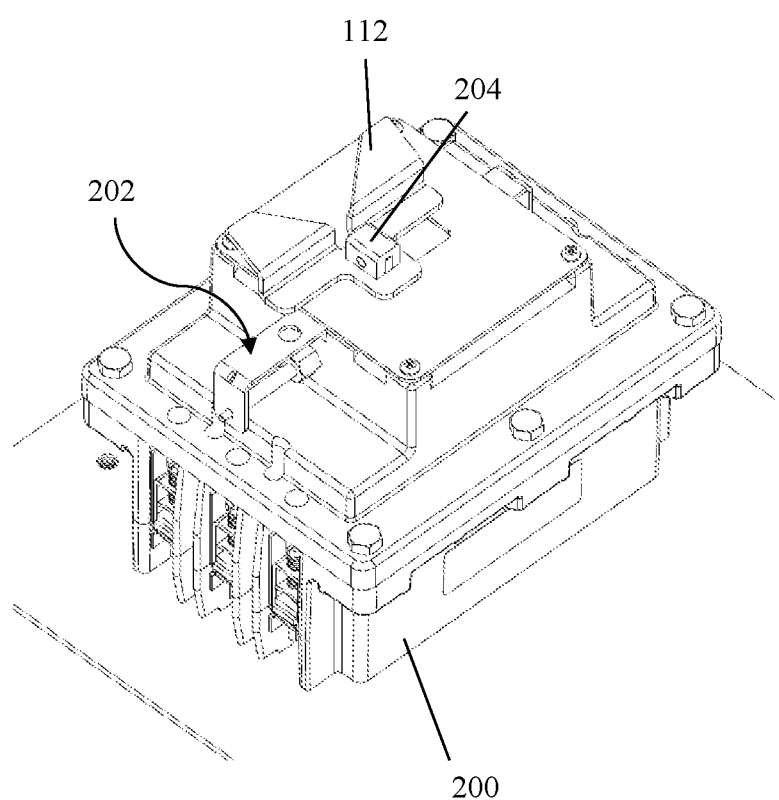

In a second embodiment, as shown in FIGS. 12A and 12B, the engaging element 150 is defined by a rod extending from the second operative end of the shaft element 144 in an axis substantially perpendicular to the axis of the shaft element 144. In one embodiment, as shown in FIG. 7, the rod has a bent configuration.

In an embodiment, the actuator plate assembly 140 includes a stopper plate 141 attached on the mounting plate 142. The stopper plate 141 has a pair of stopping elements 141A spaced apart from each at a predetermined distance. On the other hand, the shaft element 144 includes an arm 145 protruding therefrom in an axis substantially perpendicular to the axis of the shaft element 144. The arm 145 is configured to facilitate restriction of angular displacement of the handle element 146 in a predetermined angle range, thereby preventing free swivelling of the handle element 146.

The actuator 100 ensures that the circuit breaker is actuated or deactivated without exerting a relatively large amount of force. As a result, the electrical panel is not damaged when the actuator engages with the toggle 204 of the circuit breaker 202 of the switch gear.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Technical Advancements

The present disclosure described hereinabove has several technical advantages including, but not limited to, the realization of an actuator for a switch gear of an electric panel which:
cannot be visually accessed in IP66 conditions;
engages with a toggle of the circuit breaker of the switch gear without exerting a relatively large amount of force; and
does not damage the door of the electrical panel when engaging with the toggle of the circuit breaker of the switch gear.

The foregoing disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Any discussion of materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

We claim:

1. An actuator for a switch gear of an electric panel, said panel provided with a door, the switch gear having a housing and a circuit breaker provided on the housing displaceable relative thereto, said circuit breaker having a toggle protruding therefrom, said actuator comprising:
an aligner assembly comprising:
an aligner pivotably mounted on the switch gear housing, said aligner configured to be engaged with a toggle of the circuit breaker to define a plurality of angular positions of said aligner corresponding to a plurality of toggle positions, said aligner having at least one pair of slanting flanges configured at a first operative end thereof at a spaced apart distance to define a valley separated by a gap therebetween; and
an actuator plate assembly comprising:
a mounting plate mounted on the enclosure door;
a shaft element passing through said mounting plate and the door;
a handle element provided on a first operative half of said shaft element which is outside the panel, said handle element configured to be angularly displaced to facilitate rotation of said shaft element; and an engaging element attached to a second operative half of said shaft element which is inside the panel, said engaging element having at least one leg extending therefrom, said at least one leg configured to be nested in said gap of the aligner to angularly displace said aligner after being guided along the valley.

2. The actuator as claimed in claim 1, wherein an aperture is configured on said aligner to receive the toggle therein to enable engagement of the toggle with said aligner.

3. The actuator as claimed in claim 1, wherein said aligner is configured to be angularly displaced between an angular range varying from 0° to 24° in both upward and downward directions.

4. The actuator as claimed in claim 1, wherein said aligner includes at least one ear configured on an operative free end of said aligner, said ear configured to enable manual angular displacement of said aligner.

5. The actuator as claimed in claim 1, wherein said engaging element is defined by an arcuate body having a slot configured thereon to facilitate engagement of said engaging element with said shaft element, and at least one leg extending from said arcuate body.

6. The actuator as claimed in claim 1, wherein said engaging element is defined by a rod extending from said second operative end of said shaft element in an axis substantially perpendicular to the axis of the shaft element.

7. The actuator as claimed in claim 1, wherein a slot is configured on said aligner offset from said aperture to receive a pivoting pin therein, said pivoting pin being configured to enable pivoting of said aligner about its axis.

8. The actuator as claimed in claim 7, wherein said aligner assembly includes a cover plate mounted on the housing of the switch gear for mounting said aligner thereon, said cover plate having a first aperture configured thereon to receive said toggle therein, and a second aperture configured to receive said pivoting pin therein.

9. The actuator as claimed in claim 1, wherein said actuator plate assembly includes a stopper plate attached on the mounting plate, said stopper plate having a pair of stopping elements spaced apart from each other at a predetermined distance.

10. The actuator as claimed in claim 9, wherein said shaft includes an arm protruding therefrom in an axis substantially perpendicular to the axis of said shaft, said arm configured to facilitate restriction of angular displacement of said handle in a predetermined angle range.

* * * * *